United States Patent [19]

Russell, Jr.

[11] Patent Number: 4,614,034
[45] Date of Patent: Sep. 30, 1986

[54] COMPRESSION-PRODUCING TOOL

[76] Inventor: Walter C. Russell, Jr., 10232 Tamarack Dr., Vienna, Va. 22180

[21] Appl. No.: 721,415

[22] Filed: Apr. 9, 1985

[51] Int. Cl.⁴ ............................................ A47J 43/26
[52] U.S. Cl. ................................. 30/120.3; 30/120.4; 30/271
[58] Field of Search ................ 30/120.3, 120.4, 120.5, 30/120.2, 120.1, 271; 17/71, 68

[56] References Cited

U.S. PATENT DOCUMENTS

| | | |
|---|---|---|
| 896,044 | 8/1908 | Quackenbush .................... 30/120.4 |
| 1,698,620 | 1/1929 | Clark ................................. 30/120.3 |
| 1,938,733 | 12/1933 | Walling ............................. 30/120.4 |
| 2,481,447 | 9/1949 | Scaparro .......................... 30/120.3 |
| 3,064,700 | 11/1962 | Tatarek ............................ 30/120.3 |
| 3,148,718 | 9/1964 | Plott ................................. 30/120.3 |
| 3,338,281 | 8/1967 | Davy ................................ 30/120.4 |
| 4,425,707 | 1/1984 | Polsfuss .......................... 30/120.3 |
| 4,554,737 | 11/1985 | Bartels ............................. 30/120.3 |

Primary Examiner—Jimmy C. Peters
Attorney, Agent, or Firm—Wegner & Bretschneider

[57] ABSTRACT

A tool for applying compression, e.g., a nutcracker, having a hinged pair of lever arms pin connected to a common housing. The housing contains a stopping device designed to provide a fixed crushing rotation movement to crush the nutshell without crushing the nutmeat. Furthermore, when a nut or other workpiece is not inserted in the tool, the lever arms are free to move, without restraint, making insertion of the nut a convenient and random action. From the standpoint of the user, the nutcracker will look like and operate exactly like the majority of nutcrackers in use today. The major difference is the stopping action, which will prevent damage to the nutmeat and allow less fragmented crushing of the nut shell.

6 Claims, 6 Drawing Figures

COMPRESSION-PRODUCING TOOL

BACKGROUND OF THE INVENTION

The present invention relates to a compression-producing tool having a particularly advantageous use as a nutshell remover. Furthermore, the compression-producing tool of the present invention will crack and remove the shells more efficiently and without damage to the nutmeat.

DESCRIPTION OF THE PRIOR ART

Most tools or devices for producing compression on a workpiece do so directly, usually using a form of lever action. When used as a nutcracker, such tools usually comprise a pair of straight-legged lever arms, hinged together at one end and having mutually opposed roughened jaw sections on the lever arms. A nutcracker of this configuration has a serious disadvantage. While exerting maximum pressure on the nutshell, there is a simultaneous effort to stop the crushing action at the instant of cracking the shell to prevent damage to the nutmeat. The requirement to control the pressure to prevent or minimize damage to the nutmeat at the time of exertion of maximum pressure on the nutshell is a task often impossible to achieve.

Nutcrackers have assumed a variety of shapes. Representative nutcrackers are shown in U.S. Pat. No. 1,698,620 to Clark, U.S. Pat. No. 2,481,447 to Scaparro, and U.S. Pat. No. 4,425,707 to Polsfuss.

OBJECTS OF THE INVENTION

Accordingly, a major object of this invention is to provide a compression tool that operates substantially as the nutcracker described above but including a stopping device to limit the extent to which the nutcracker can crush the nut. The presence of the stopping device will allow the user to exert maximum crushing pressure without trying to limit the closing distance of the lever arms of the compression-producing tool.

Further objects and advantages of the invention will become apparent from a consideration of the ensuing description thereof.

DETAILED DESCRIPTION OF THE INVENTION

Figure 1:
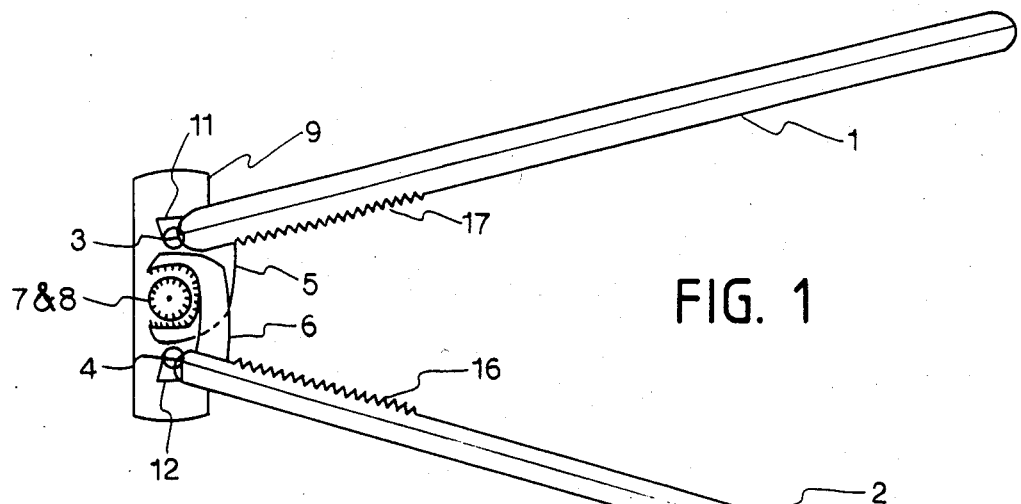
FIG. 1 is a drawing of the compression-producing tool in a non-stressed position, i.e. without a workpiece in the device.
Figure 1A:
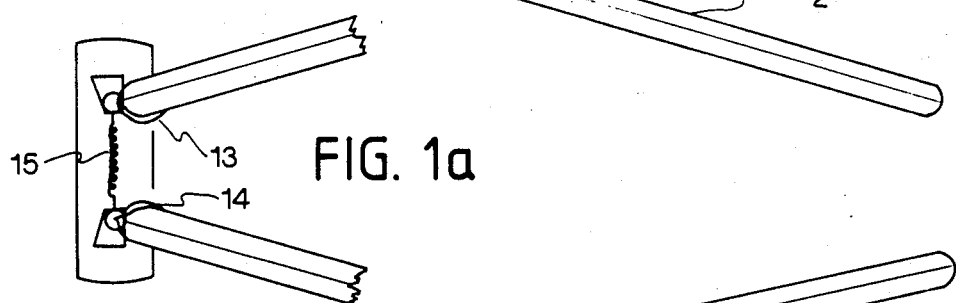
FIG. 1a is a clarification drawing showing that a spring 15 under tension will be connected between pins 3 and 4 pulling the pins into the inward position in the non-stressed condition.
Figure 2:
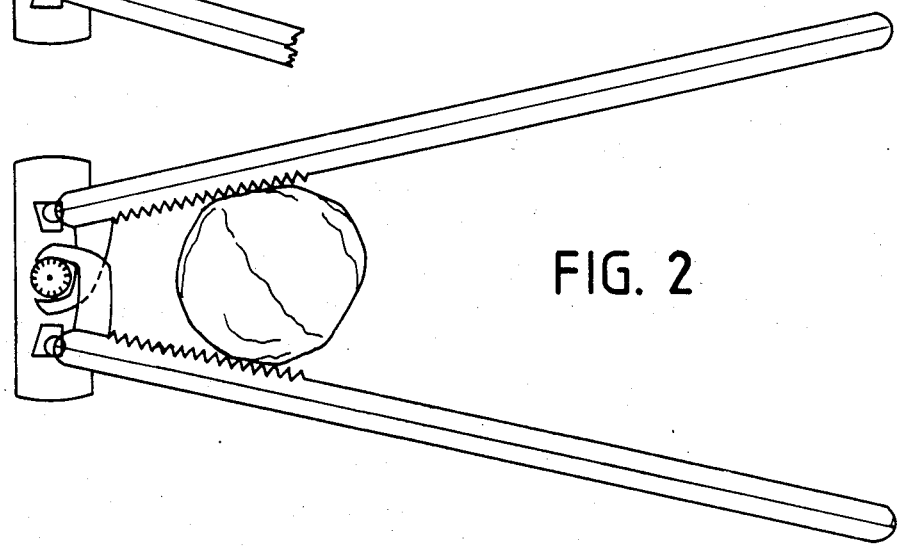
FIG. 2 is a drawing of the compression-producing tool with a nut providing stress to offset the spring action (note that pins 3 and 4 have moved to the outward positions, allowing the stopping device to engage)
Figure 3:
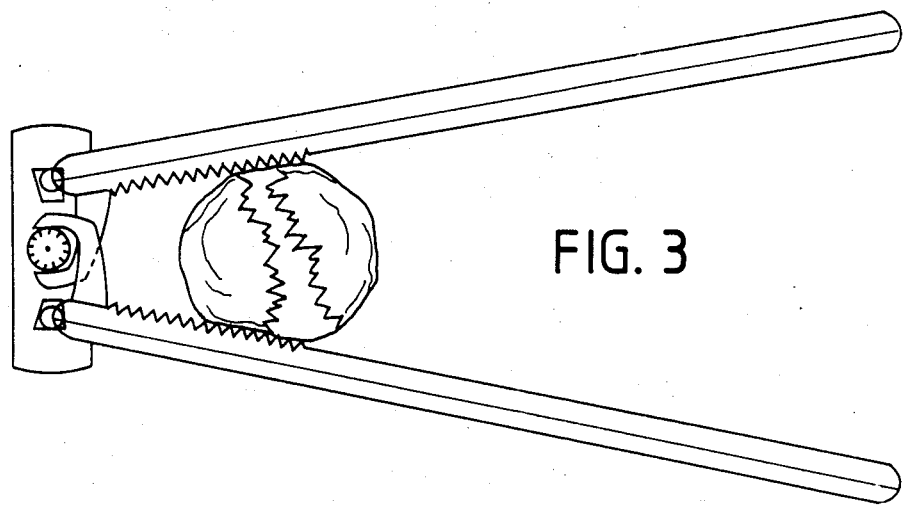
FIG. 3 is a drawing of the compression-producing tool after the lever arms have rotated their maximum distance as allowed by the stopping device.
Figure 4:
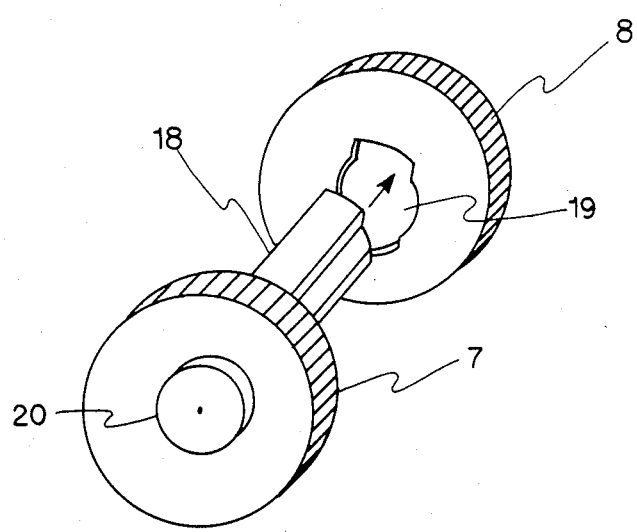
FIG. 4 is an enlarged drawing of the stopping device shown from an angle to demonstrate in principle the two wheel interlocking nature of the stopping device.

As shown in FIGS. 1, 2, and 3, the compression-producing tool of the present invention has two lever arms 1 and 2 hinged at their ends by pins 3 and 4. The lever arms are free to rotate around or with the pins. Lever arms 1 and 2 have grooved surfaces 16 and 17 to hold the nut during the crushing motion. Each lever arm 1 and 2 has a stop arm 5 and 6, respectively, made as an integral part of the lever arm. Each of the stop arms has grooved teeth to mesh with their respective stop wheels 7 and 8. Wheel 7 has a shaft 18 and wheel 8 has a receptacle 19. The shaft 18 is cut in such a manner as to allow a selected but restricted rotational movement when shaft 18 is inserted into receptacle 19; see FIGS. 4 and 5.

In operation, wheel 7 is turned by lever stop arm 6 and wheel 8 is turned by lever stop arm 5. Both wheels 7 and 8 have grooved teeth to mesh with the teeth in stop arms 5 and 6.

Wheels 7 and 8 are free to rotate together on their common outside shaft 20 if the wheels are not engaged by both lever arms simultaneously.

Figure 5:
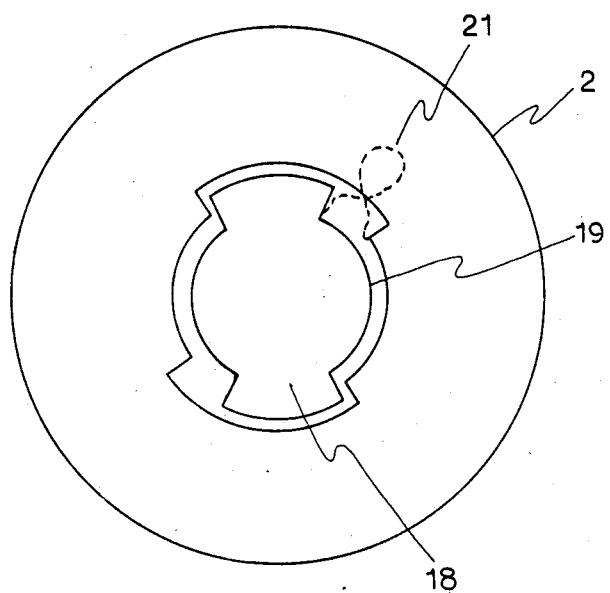
FIG. 5 is an enlarged end view of the stopping device to show how the shaft of one wheel is inserted in the receptacle of the other wheel allowing a fixed opening between the shaft and the receptacle. A coil spring is inserted to demonstrate visually the spring action required to hold this fixed opening position between the shaft and receptacle.

FIG. 5 is an enlarged cut away end view of shaft 18 inserted in receptacle 19. A coil spring 21 is shown exerting opposite forces on shaft 18 and receptacle 19. This force tends to separate and hold shaft 18 and receptacle 19 in the relatively fixed open position shown. The space between the shaft 18 and the receptacle 19 is selected to correspond to the rotational motion desired by the stop device during the crushing action. The coil spring 21 is symbolic in that actual implementation of this spring action might be somewhat different than shown.

In operation, when the device of FIG. 1 is not held or held very lightly, springs 13 and 14 will spread lever arms 1 and 2 apart such that the lever arms will be wide enough to accommodate relatively large nuts and other workpieces.

With no nut or other object to be compressed in the device, pins 1 and 2 will be held by spring 15 in their inward position. (See FIG. 2). In this position, the lever stopping arms 5 and 6 will not engage wheels 7 and 8. The lever arms will be free to move from the fully closed to the fully open position with no restraint. (See FIG. 1.)

When a nut is inserted between the lever arms 1 and 2 and a minor squeezing action is applied to the lever arms, an outward force is placed on pins 3 and 4. This force causes pins 3 and 4 to move outwardly, overcoming the spring action of spring 15, and allows the wheels 7 and 8 of the stopping device to be engaged by the lever stopping arms 5 and 6. (See FIG. 2.)

At this point of the operation, pins 3 and 4 are pressed against the outer extremities of their elongated holes 11 and 12 and the stopping device is engaged. After the stopping device is engaged and the crushing action begins, the stopping device is designed to allow only a fixed rotational movement which stops abruptly. This fixed movement crushes the nutshell and not the meat of the nut.

Prior to engagement of the stopping device, coil spring 21 exerts force on the shaft of wheel 7 counter-clockwise and clockwise on wheel 8, thus holding a fixed opening between the shaft of wheel 7 and the receptacle of wheel 8. This relative position will be maintained by spring action until opposite forces are applied to both wheels at the same time. With forces applied to only one wheel at a time, both wheels will turn in the same direction without changing the fixed opening between the shaft and wheel receptacle.

The fixed opening in terms of degrees will be selected to correspond to the angular motion desired in the lever arms during the crushing action.

During the crushing action, both wheels will be engaged by their stopping arms and rotated in opposite directions to each other. The coil spring action will be overcome and the arms will rotate only as far as the fixed opening allows. At this instant, when the rotational movement has transversed the fixed distance of the opening, the crushing action will be abruptly terminated.

When releasing pressure on the lever arms, pins 3 and 4 will be drawn inward by spring 15 and the stopping device wheels will disengage from the stopping lever arms. When the lever arms are disengaged, the coil spring action between the shaft of wheel 7 and the receptacle of wheel 8 will automatically return the shaft and the receptacle to their fixed open position.

While the operation described above occurs in distinct sequences, the actions, as sensed by the user, will tend to be a single crushing action which terminates abruptly after crushing the nutshell.

While the embodiment of the tool shown in FIGS. 1 through 5 are the preferred embodiment of my compression-producing tool, many variations and improvements could be made to the specifics described. Therefore, the specifications and descriptions should not be construed as limitations upon the scope of the invention, but rather as an exemplification of a preferred embodiment thereof. Various other embodiments and ramifications will occur to those skilled in the art.

For example, different stop devices could be designed which would, however, make use of the stop device engagement motion of this tool. While described for use primarily as a nutcracker, the device of this invention can also be used on other work pieces, such as hardshell seafoods. In fact, a variation of the nutcracker tool might simply include a different fixed opening in the stop device to accommodate the crushing motion more suited to the shell of a hardshell seafood.

While I believe that the above present theory of operation is accurate, I do not wish to be bound thereby since other and/or alternative theories of operation which explain the improved results of my nutshell remover may be applicable. Accordingly, the scope of the invention should be determined only by the appended claims and their legal equivalents.

What is claimed is:

1. A compression-producing tool comprising
   two lever arms hinged by pins in a common housing, said common housing having a separate elongated hole for each lever arm, said elongated holes determining the permitted distance of movement of said pins,
   tension means connecting said pins to return said pins to the inward position of said elongated holes, and
   a stop device that is engaged when stressed by an object placed between said lever arms and that is automatically disengaged when an object is not in place between said lever arms.

2. The compression-producing tool of claim 1 wherein said stop device comprises two wheels and two stop arms for engagement with said wheels.

3. The compression-producing tool of claim 2 wherein said wheels and said stop arms each have grooved teeth to mesh with each other on contact.

4. The compression-producing tool of claim 2 wherein said stop arms are shaped to allow turning thereof around said stop wheels without engaging when said stop device is not in the stop mode to provide unrestricted movement of said lever arms.

5. The compression-producing tool of claim 4 wherein one of said wheels includes a shaft shaped to fit a receptacle in the other of said wheels in a manner to provide restricted rotational motion of one of said wheels with the other of said wheels when said wheels are counter rotated with respect to each other.

6. The compression-producing tool of claim 5 wherein the opening between said shaft and said receptacle is under coil spring tension to hold the fixed open position if there is only a minor or no counter rotational force.

* * * * *